United States Patent [19]

Berg

[11] Patent Number: 4,852,779

[45] Date of Patent: Aug. 1, 1989

[54] COLLAPSIBLE BIKE RACK FOR AUTOMOTIVE VEHICLE

[76] Inventor: Kevin Berg, P.O. Box 470, Cal-Nev-Ari, Nev. 89039

[21] Appl. No.: 156,451

[22] Filed: Feb. 16, 1988

[51] Int. Cl.⁴ .......................... B60R 9/10; B60P 3/06
[52] U.S. Cl. ................................. 224/42.32; 211/21; 410/3
[58] Field of Search ....... 224/30 R, 42.42 R, 42.45 R, 224/324, 42.03 B, 310, 325, 326, 42.32, 42.33, 42.34, 42.35, 42.36; 211/21, 22, 23, 24, 20, 5, 86, 17, 195, 198, 200, 18, 19; 296/37.8, 37.5, 37.1, 37.6; 410/3, 122, 96, 103, 116, 120, 7, 9, 10, 11, 12, 30; 414/462

[56] References Cited

U.S. PATENT DOCUMENTS

| | | | |
|---|---|---|---|
| 577,663 | 2/1897 | Peace | 211/21 |
| 592,086 | 10/1897 | Frambes | 211/21 |
| 603,422 | 5/1898 | Burkhardt | 211/20 X |
| 661,359 | 11/1900 | Tiefel | 211/21 |
| 703,280 | 6/1902 | Knoche | 211/20 |
| 3,176,903 | 4/1965 | Farley | 224/42.03 B |
| 3,599,798 | 8/1971 | Osborn | 211/20 |
| 3,785,500 | 1/1974 | Kennelly | 211/21 X |
| 3,785,517 | 1/1974 | Brajkovich | 414/462 |
| 3,883,002 | 5/1975 | Moore | 211/18 |
| 4,078,821 | 3/1978 | Kitterman | 410/3 X |
| 4,243,243 | 1/1981 | Edmisten | 410/3 X |
| 4,257,644 | 3/1981 | Stephens | 410/96 X |
| 4,437,597 | 3/1984 | Doyle | 211/20 X |
| 4,441,736 | 4/1984 | Shedden | 410/3 X |
| 4,540,213 | 9/1985 | Herlitz et al. | 296/37.5 |

FOREIGN PATENT DOCUMENTS

| | | | |
|---|---|---|---|
| 1553133 | 1/1969 | France | 211/20 |
| 16479 | of 1899 | United Kingdom | 211/17 |
| 451367 | 8/1936 | United Kingdom | 211/21 |
| 700968 | 5/1952 | United Kingdom | 410/3 |
| 1578417 | 11/1980 | United Kingdom | 211/22 |

Primary Examiner—Harvey C. Hornsby
Assistant Examiner—Scott J. Haugland
Attorney, Agent, or Firm—Charles H. Thomas

[57] ABSTRACT

A collapsible rack is provided for installation in the bed of an automotive vehicle, such as a van, pickup truck or trailer. The rack includes a rectangular grate which defines a plurality of bike wheel receiving slots and which is carried between a pair of parallel arms. The arms are rotatably secured to the ends of the grate and to the bed of a vehicle so that the grate can be moved between a collapsed position lying upon the bed of the vehicle and an erected position inclined relative to the vehicle bed to receive the front wheel of a motorized bike. A pair of straps of adjustable length are provided with hooks on both ends to extend between the grate and a motorized bike with a wheel of the motorized bike positioned in one of the slots to hold the motorized bike erect in the bed of an automotive vehicle.

8 Claims, 2 Drawing Sheets

COLLAPSIBLE BIKE RACK FOR AUTOMOTIVE VEHICLE

BACKGROUND OF THE INVENTION

1. Field of the Invention

The present invention relates to a collapsible rack adapted for installation in the bed of an automotive vehicle for transporting a bike, particularly a motorized bike.

2. Description of the Prior Art

In recent years off-road biking, particularly motorized biking, has become an increasingly popular recreational pastime. Motorized bikes, such as dirt bikes, trail bikes, motor scooters and motorcycles have gained wide popularity for use as an active recreational outlet. Many individuals derive great pleasure from riding on motorized bikes in an off-road environment, such as along bike trails or through unobstructed cross-country terrain, such as deserts. The locations where such off-road biking is permitted are typically located considerable distances from populated areas. Accordingly, most individuals who wish to participate in recreational motorized biking find it necessary to transport their motorized bikes from populated areas in which they live to open country locations where motorized biking is permitted. Automotive vehicles are widely used in the transportation of motorized bikes for this purpose.

While different types of automotive vehicles are employed for the purpose of transporting motorized bikes, in virtually all cases the motorized bike must be positioned and restrained within the bed of an automotive vehicle, such as a pickup truck, van or trailer. However, no satisfactory means of transporting a motorized bike within the bed of an automotive vehicle has previously been devised. According to conventional techniques for transporting a bike, the bike may be supported within the bed of an automotive vehicle in an upright position by means of tie downs or ropes which are attached to the interior walls of the vehicle or to hooks or pad eyes in the floor of the vehicle. However, it is very difficult to satisfactorily immobilize a bike within the bed of an automotive vehicle in this fashion. All too frequently the extent of immobilization is inadequate and the bike can be damaged by movement within the bed of the automotive vehicle as it travels, particularly when the automotive vehicle passes across rough terrain.

One alternative transportation technique is to lay the motorized bike on its side in the bed of an automotive vehicle. However, when transported in such a position a motorized bike is deprived of the cushioning effect of its tires and may be damaged by shocks and jolts transmitted to it through the chassis of an automotive vehicle in which it is transported. Furthermore, transportation of a motorized bike lying on its side in the bed of an automotive vehicle requires considerable space and severely limits the ability to transport other cargo in the vehicle bed.

A further alternative transportation technique which is sometimes used to carry motorized bikes in the bed of a pickup truck is for the front wheel of the motorized bike to be wedged into a corner of the pickup truck bed, and for tie downs to be attached to the handlebars to keep the bike in place. However, to transport a motorized bike in this manner it is necessary to twist the front wheel of the motorized bike to an extreme angle relative to the bike chassis. Transportation of the motorized bike in this fashion places an extreme amount of torque on the front forks of the bike. If the transporting automotive vehicle passes over a rough bump, the torque and the flexion acting upon the bike can bend the front forks.

In attempts to solve the foregoing problems various different bike racks have been marketed for the purpose of transporting motorized bikes in the beds of automotive vehicles. Such conventional racks are generally constructed of bent tubing or flat bars erected in a rigid framework which occupies a considerable portion of the vehicle bed. Thus, one must either load and unload such conventional racks from the vehicle bed in order to utilize the cargo storage area of the vehicle bed for purposes other than transporting bikes, or sacrifice the cargo area occupied by the rack. Moreover, when such conventional bike racks are unloaded from the transporting automotive vehicle with which they are used, they present significant storage problems since they then occupy large areas of garages, storage sheds and other storage locations.

SUMMARY OF THE INVENTION

One object of the present invention is to provide a collapsible bike rack which can be mounted in the bed of an automotive vehicle and which may be quickly and easily moved between an erected position suitable for immobilizing a motorized bike in an upright disposition within the vehicle, and a collapsed position in which the rack lies flat against the vehicle bed. The collapsible rack of the invention thereby provides a very effective means of protecting a motorized bike from damage while the bike is being transported in the bed of an automotive vehicle, while retaining virtually the entire cargo area of the vehicle when the collapsible rack is not in use.

Another object of the invention is to provide a collapsible bike rack for use in the bed of an automotive vehicle which requires only a very minimum effort to erect and collapse, and which requires only minimal tie down devices. The tie down devices employed according to the invention are merely a pair of straps of adjustable length having releasable coupling means for releasably securing the frame of the bike rack to the handlebars of a bike. The straps may be secured to the rack and to the handlebars of the bike with very little effort and in only a few moments of time.

In one broad aspect the present invention is a collapsible bike rack for use in an automotive vehicle comprising a rectangular frame formed with a first pair of parallel sides serving as horizontal members and a second pair of parallel sides serving as ends oriented perpendicular to the horizontal members. The rectangular frame further includes a plurality of interior dividers extending between the horizontal members and parallel to the ends and spaced apart to define the openings to receive a wheel of a bike. A pair of arms of equal length are each rotatably hinged along a common axis to a separate one of the frame ends. Some means is provided for rotatably coupling the arms to the bed of an automotive vehicle so that the arms rotate in tandem parallel to each other to alternatively bring the frame into an erected position inclined relative to the bed of an automotive vehicle and a collapsed position residing flat against the vehicle bed. The rack of the invention further includes straps of adjustable length having releasable coupling means for releasably securing the frame of the rack to a bike positioned with a wheel in one of the openings. Preferably, at least some of the interior dividers in the rectangular frame are spaced at different intervals from each other to define openings of different widths. Thus, a bike rack constructed in accordance with such an embodiment of the invention may be utilized to transport different models of motorized bikes which have bike wheels of different widths.

The means for coupling the arms to the bed of a vehicle in the collapsible bike rack of the invention preferably is comprised of a horizontally disposed axle that extends between the arms and which is located on the bed of the vehicle. The arms are rigidly joined to the ends of the axle remote from the common axis passing through the ends of the rectangular frame. The axle thereby turns in rotation with the arms. A sleeve is disposed about the center of the axle and some fastening means, such as U-bolts, rigidly secures the sleeve to the bed of an automotive vehicle. The axle thereby turns within the sleeve which serves as a bearing.

When the bike rack of the invention is utilized to transport a motorized bike in the bed of an automotive vehicle, the rectangular frame is merely pulled upwardly from a flat disposition resting upon the floor of the vehicle bed. The rotatable arms allow the frame to be carried in rotation into a disposition inclined at an angle, typically between about thirty and forty five degrees relative to the floor of the bed of the vehicle. The front wheel of a motorized bike is then inserted into a gap or slot between the interior dividers within the frame so as to hold the motorized bike in an upright disposition with its wheels resting on the floor of the bed of the vehicle. A pair of straps of adjustable length are then used to secure the motorized bike to the rectangular frame. The straps are typically attached to the handlebars of the motorized bike and are secured to the rectangular frame at the upper member thereof proximate to the inclined ends of the frame. The straps are preferably comprised of looped lengths of inelastic fabric having a cinch thereon with releasable coupling means, such as hooks, at both ends. One hook of each strap is placed over a handlebar or frame member of the motorized bike and the other hook is secured to the inclined frame. The cinches are tightened to maintain tension between the frame and the motorized bike so as to hold the frame in its erected inclined disposition and so as to hold the wheel of a bike within a slot or gap within the frame.

In all applications of the rack of the invention, proper tension on the straps of adjustable length will prevent the rack and motorized bike from moving longitudinally. It is recommended, however, that floor anchors also should be employed at the rear of the automotive vehicle bed to provide additional stability. When a pair of floor anchors are secured to the rear of the bed of a vehicle they are positioned in laterally spaced separation from each other. Additional straps of adjustable length having releasable coupling means are also provided for attachment to the rear of the bike for releasably securing the floor anchors to a bike positioned with a wheel in one of the openings of the frame. The floor anchors at the rear of the automotive vehicle bed effectively prevent the rear wheel of the bike from rising in the event of a sudden stop.

The invention may be described with greater clarity and particularity by reference to the accompanying drawings.

DESCRIPTION OF THE PREFERRED EMBODIMENT

Figure 1:
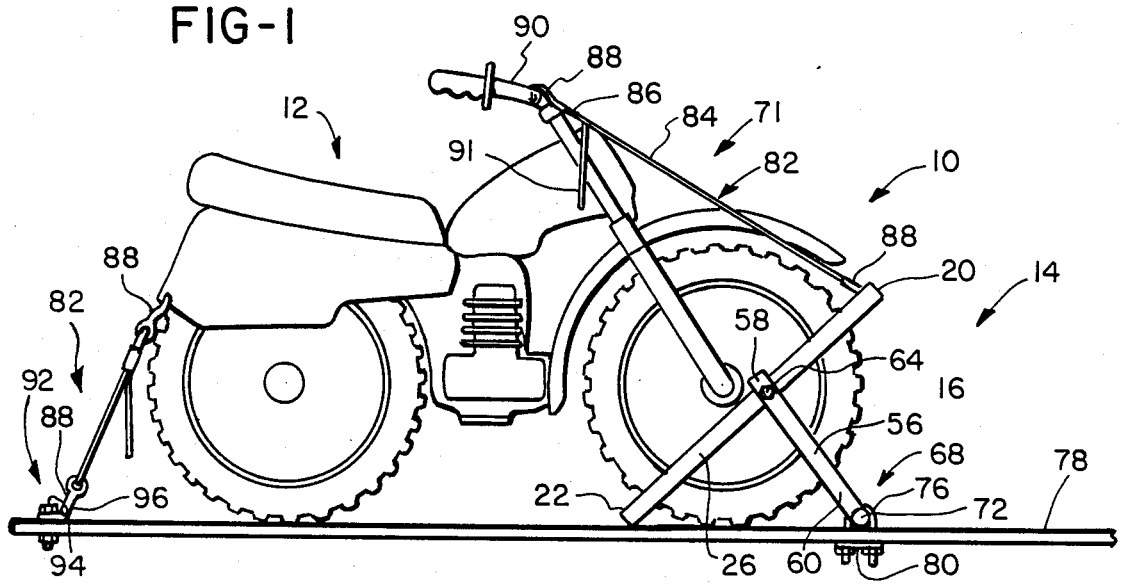
FIG. 1 is a side elevational view of the collapsible bike rack of the invention supporting a motorized bike for transportation in the bed of an automotive vehicle.
Figure 2:
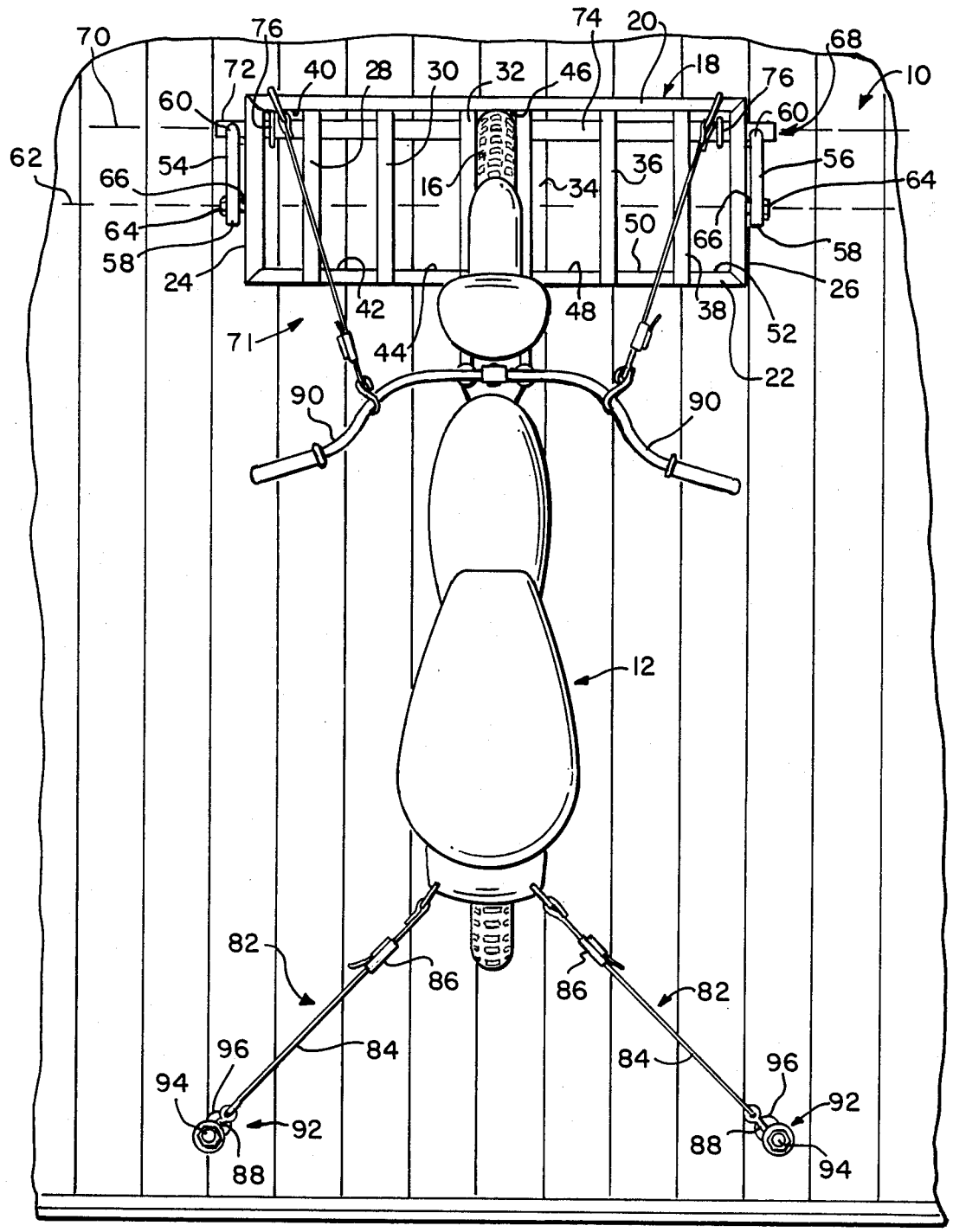
FIG. 2 is a top plan view of the installation of FIG. 1

FIG. 1 illustrates a collapsible bike rack device, indicated generally at 10 for securing a bike, such as the dirt bike 12 in an upright disposition in the bed 14 of an automotive vehicle, such as a van. In FIGS. 1 and 2 the collapsible bike rack 10 is illustrated in an erected position inclined relative to the vehicle bed 14 to reeive the front wheel 16 of the dirt bike 12. The collapsible bike rack is illustrated in a collapsed position flattened upon the vehicle bed 14 in FIG. 3.

Figure 3:
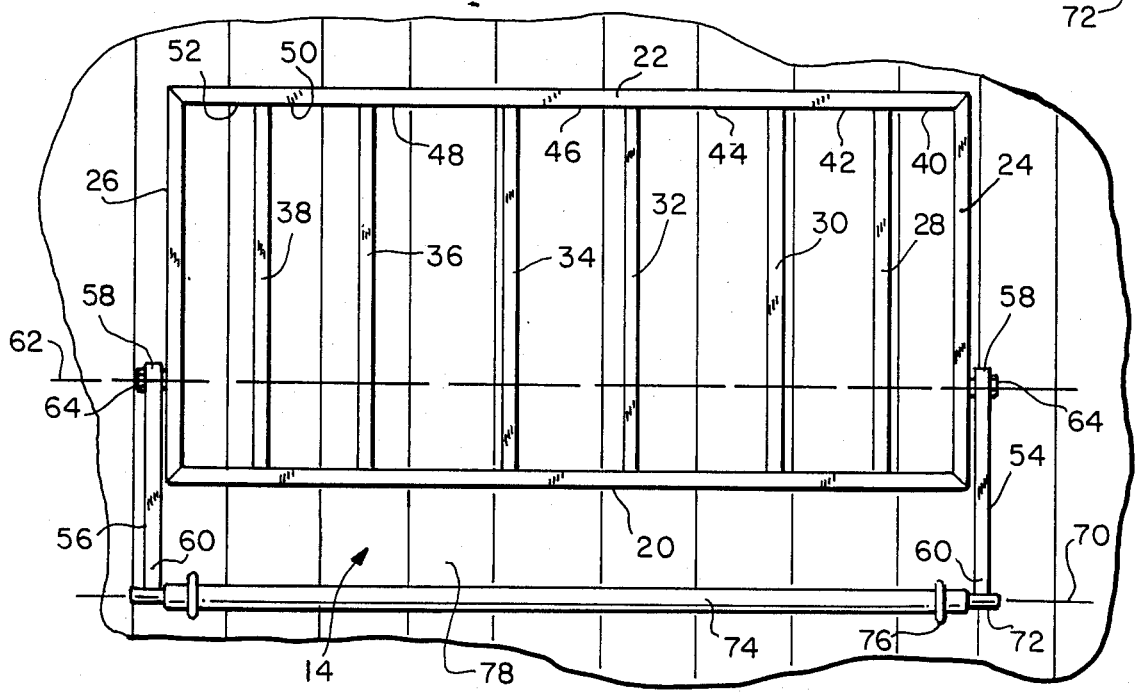
FIG. 3 is a top plan view showing the bike rack of FIG. 1 in a collapsed position.

As best illustrated in FIGS. 2 and 3, the collapsible bike rack 10 is comprised of a flat, rectangular grate or frame 18 bounded by parallel, horizontal top and bottom members 20 and 22, respectively, and mutually parallel side members 24 and 26, which serve as mutually parallel ends of the frame 18. The end members 24 and 26 are joined to the top and bottom members 20 and 22 in perpendicular disposition relative thereto. Within the perimeter of the rectangular frame 18 there are a plurality of parallel slats 28, 30, 32, 34, 36 and 38 which serve as interior dividers and which extend between the top and bottom horizontal members 20 and 22. The slats 28-38 are mutually parallel to each other and are spaced from each other to define a plurality of gaps or slots 40, 42, 44, 46, 48, 50 and 52. Each of the slots or gaps 40-52 is adapted to receive a wheel of a motorized bike.

The collapsible bike rack 10 also includes a pair of parallel arms 54 and 56 each having a first end extremity 58 and a second end extremity 60. The first end extremities 58 of the arms 54 and 56 are joined to the opposite ends 24 and 26 of the frame 18 between the top member 20 and the bottom member 22 along a first, common horizontal axis indicated at 62 in FIGS. 2 and 3. The first extremities 58 of the arms 54 and 56 are joined to the frame 18 at hinged connections formed by means of bolts 64 and spacers 66, whereby the frame 18 is rotatable between the arms 54 and 56.

The collapsible bike rack 10 also includes a means indicated generally at 68 for hingedly joining the second extremities 60 of the arms 54 and 56 to the automotive vehicle bed 14 for rotation relative thereto along a second common horizontal axis indicated at 70 in FIGS. 2 and 3. The arms 54 and 56 thereby move parallel to each other in vertical planes and carry the frame or grate 18 in rotation alternatively between a collapsed position lying flattened upon the automotive vehicle bed 14 in contact therewith, as depicted in FIG. 3, and a raised or erected position inclined relative to the vehicle bed 14 in which the bottom member 22 of the frame 18 rests upon the bed 14 and the top member 20 is elevated thereabove. In the raised or erected position the frame 18 receives the wheel 16 of the dirt bike 12 in one of the gaps or slots 40-52, as illustrated in FIGS. 1 and 2.

The collapsible bike rack 10 also includes extendable means indicated generally at 71 for releasably joining the frame or grate 18 to the dirt bike 12 when the front wheel 16 of the dirt bike 12 is positioned in a bike wheel receiving slot, such as the slot 46 as depicted.

The structural members of the frame 18 are preferably constructed of one inch by one inch square steel or aluminum tubing, the wall thickness of which may be one eighth or one quarter inch and will vary between applications. The corners of the top and bottom members 20 and 22 and the end members 24 and 26 are mitered and are welded together. The dividing slats 28-38, also formed of one inch by one inch square steel or aluminum tubing, are likewise welded to the top and bottom members 20 and 22.

Although the dimensions of the structural members of the frame 18 will vary for use with different vans, pickup trucks or trailers, in one embodiment of the invention suitable for installation in a van the top and bottom members 20 and 22 are fifty two inches in length and the end members 54 and 56 are twenty seven inches in length. The slots or gaps 40 and 52 are four inches in width while the slots 42 and 50 are six inches in width. The slots 44 and 48 are each eight and one half inches in width, while the slot 46 is seven inches in width. The arms 24 and 26 are each fifteen inches in length. The bolts 64 may be three-eighths of an inch in diameter by two and one-half inches in length or one-half inch in diameter by three inches in length.

The means 68 for joining the second extremities 60 of the arms 54 and 56 to the automotive vehicle bed 14 includes an axle 72 which is formed by a cylindrical annular pipe one and one quarter inches in diameter and fifty six inches in length. The pipe 72 serves as an axle and the second end extremities 60 of the arms 54 and 56 are welded to the ends of the axle 72. A cylindrical annular sleeve 74 is disposed about the center of the axle 72 and serves as a bearing for receiving the axle 72. The sleeve 74 is adapted for rigid securement to the automotive vehicle bed 14 by means of U-bolts 76. The U-bolts 76 extend through the floor 78 of the automotive vehicle bed 14 through backing plates 80 beneath the vehicle bed 14. Preferably, the backing plates 80 are overlapped with frame members of the vehicle chassis to enhance the securement of attachment of the collapsible bike rack 10 to the automotive vehicle bed 14.

Together the axle 72 and the sleeve 74 form a hinge system which allows the arms 54 and 56 to rotate in tandem, parallel to each other, to raise and lower the rectangular frame 18. The rectangular frame 18 is likewise rotatable relative to the supporting arms 54 and 56. The common axis 62, by means of which the frame 18 is attached to the arms 54 and 56, lies between the top and bottom members 20 and 22 of the frame or grate 18.

When the collapsible bike rack 10 is not to be used, it resides collapsed flush against the floor 78 of the bed 14 of an automotive vehicle, as depicted in FIG. 3. Foam padding may be laid beneath the frame 18 to prevent it from rattling. In this position the collapsible bike rack 10 protrudes upwardly above the plane of the floor 78 little more than an inch, so that other articles to be transported can be positioned atop the frame 18. The collapsible bike rack 10 thereby does not significantly diminish the cargo area of the automotive vehicle bed 14, and is, in effect, self storing.

Figure 5:
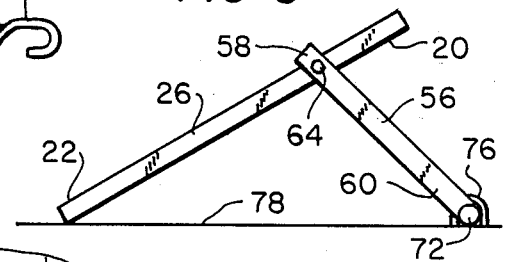
FIG. 5 is a side elevational view illustrating the frame of the collapsible bike rack in an alternative position.

When the collapsible bike rack 10 is to be utilized, on the other hand, the arms 54 and 56 are raised in rotation, thereby rotating the axle 72. The rectangular frame 18 moves in counter-rotation relative to the arms 54 and 56 with the bottom member 22 resting upon the floor 78 of the automotive vehicle bed 14, and with the top member 20 elevated thereabove. The frame or grate 18 is raised to an angle which will vary somewhat with the size of the wheel of the motorized bike to be positioned therewithin. The angle of inclination may be relatively slight, as depicted in FIG. 5, or greater, as depicted in FIG. 1. The angle of inclination of the frame 18 relative to the floor 78 of the bed 14 of the automotive vehicle is typically between about thirty degrees and forty five degrees.

Figure 4:
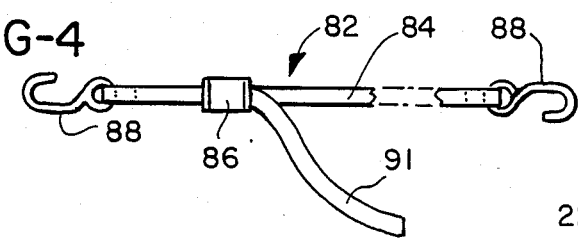
FIG. 4 is a detail view illustrating the straps of adjustable length employed in the installation of FIGS. 1 and 2.

Once the frame 18 has been moved to its raised or erected position, as depicted in FIGS. 1 and 2, the dirt bike 12 is secured in upright disposition relative thereto using extendable means 71. Preferably, the extendable means 71 are provided in the form of a pair of flexible, fabric straps 82, one of which is depicted in detail in FIG. 4. Each of the straps 82 is preferably formed of an elongated, heavy-duty inelastic fabric length or strip 84 which is looped back upon itself to pass through a cinch 86. The construction and configuration of the strip 84 and the cinch 86 is similar to that employed in automotive vehicle seat belts. Each of the opposite ends of each strap 82 is provided with a metal hook 88 secured thereto.

To immobilize the dirt bike 12 in an upright disposition with the front wheel 16 thereof disposed within the slot 46, and to hold the rectangular frame 18 in its raised and operative position, as indicated in FIGS. 1 and 2, one of the hooks 88 of each strap 82 is placed over each of the handlebars 90 of the dirt bike 12 and the other hook 88 of each strap is hooked over the top member 20 of the rectangular frame 18 proximate to the opposite end members 24 and 26 thereof. The free extremities 91 of the fabric strips 84 are then pulled through the cinches 86 to shorten the operative lengths of the straps 82 and thereby exert tension between the handlebars 90 and the top member 20 of the frame 18. By exerting tension between the handlebars 90 and the top frame member 20, the front wheel 16 of the dirt bike 12 is pulled forwardly to bear against the top member 20 and downwardly to bear against the floor 78 of the automotive vehicle bed 14. The straps 82 of the extendable means 71 are pulled tight enough to slightly compress the springs which act between the front wheel 16 and the chassis of the dirt bike 12 so that tension is always exerted between the bike handlebars 90 and the rectangular frame 18.

In the installation of the collapsible bike rack 10 in a van, as illustrated in the drawing figures, it is preferable to provide the collapsible bike rack 10 with floor anchors indicated generally at 92. Each of the floor anchors 92 employs a bolt 94 that extends through the floor 78 of the automotive vehicle bed 14 and is secured on its underside by a nut. The bolt 94 passes through a chain plate 96 which provides an eye adapted to receive a hook 88 of additional straps 82. The hooks 88 at the opposite end of each of the additional straps 82 are secured to some convenient structure on the rear of the dirt bike 12. As with the other straps 82 of the means 71, the free ends 92 of the fabric strips 84 are pulled through the cinches 86 so that these additional straps exert a downwardly and rearwardly directed force at the rear of the dirt bike 12.

When the collapsible bike rack 10 is installed as illustrated in FIGS. 1 and 2, and a dirt bike 12 or other motorized bike is secured in the manner illustrated in FIGS. 1 and 2, a motorized bike can be transported a considerable distance and over very rough terrain in the bed 14 of an automotive vehicle without the danger of being damaged. In its erected position the collapsible bike rack 10 holds the motorized bike immobile upon the floor 78 of the automotive vehicle bed 14 in an upright disposition. When the automotive vehicle has reached its destination, the cinches 86 are merely loosened, thus allowing dislodgement of the hooks 88. The dirt bike 12 can then be easily removed from the automotive vehicle bed 14. Upon removal of the dirt bike 12, the frame 18 and the supporting arms 54 and 56 will counter-rotate downwardly relative to each other, thus totally collapsing the bike rack 10 upon the floor of the automotive vehicle bed 14, as depicted in FIG. 3.

By providing the grate 18 with a plurality of wheel receiving slots of different widths, the collapsible rack 10 can be utilized to snugly receive wheels of different sizes. Also, up to three motorized bikes can be transported at the same time utilizing the collapsible rack 10 depicted in the drawings. When three motorized bikes are to be transported concurrently, the center bike is positioned to face rearwardly with its rear wheel captured within a slot in the grate 18, while the outermost two bikes are positioned to face forwardly with their front wheels immobilized in the grate 18.

Undoubtedly, numerous variations and modifications of the invention will become readily apparent to those familiar with the transportation and use of motorized bikes. For example, while the straps 82 employed in the embodiment illustrated utilize releasable hooks at both ends, it is to be understood that one end of each of the straps could be permanently fastened to the frame 18 or to one of the floor anchors 92. Also, a different hinge arrangement, such as stub axle connectors could be employed to rotatably connect the supporting arms 54 and 56 to the vehicle bed 14. Collapsible racks utilized to transport non-motorized bicycles may be constructed of lightweight square or round aluminum tubing. Accordingly, the scope of the invention should not be construed as limited to the specific embodiment illustrated and described herein, but rather is defined in the claims appended hereto.

I claim:

1. A collapsible bike rack for use in an automotive vehicle comprising a rectangular frame formed with a first pair of parallel sides serving as horizontal members and a second pair of parallel sides serving as ends oriented perpendicular to said horizontal members and further including a plurality of interior dividers extending parallel to said ends and spaced arart to define openings to receive a wheel of a bike, a pair of arms of equal length each rotatably hinged along a common axis to a separate one of said ends, means for rotatably coupling said arms to the bed of the vehicle comprised of a horizontally disposed axle extending between said arms and located on said bed of said vehicle wherein said arms are rigidly joined to the ends of said axle remote from said common axis whereby said axle turns in rotation with said arms, a sleeve disposed about the center of said axle, and means for rigidly securing said sleeve to said bed of said vehicle, whereby said axle turns within said sleeve and whereby said arms rotate in tandem parallel to each other to alternatively bring said frame into an erected position and a collapled position residing flat against said vehicle bed, and straps of adjustable length having releasable coupling means for releasably securing said frame to a bike positioned with a wheel in one of said openings.

2. A device for securing a bike in an upright disposition in the bed of an automotive vehicle comprising a flat, rectangular grate defining at least one bike wheel receibing slot and rounded by horizontal top and bottom members and mutually parallel end members extending between said top and bottom members, rotatable arms of equal length having first and second end extremities, first hinge means joining each of said first end extremities of said arms to a separate one of said ends of said grate along a common horizontal axis, second hinge means comprising an axle extending between and coupled to said second end extremities of said arms, and a sleeve disposed bout the center of said axle and located between said second end extremities of said arms, whereby said sleeve is adapted for rigid securement to said bed of said vehicle, and whereby said arms move parallel to each other in vertical planes and carry said grate between a collapsed position lying upon said bed of said vehicle and a raised position in which said bottom member rests upon said bed of said vehicle and said top member is elevated thereabove, and extendable means for releasably joining said grate to a bike when a wheel of said bike is positioned in said bike wheel receiving slot.

3. A collapsible bike rack according to claim 1 wherein at least some of said interior dividers are spaced at different intervals from each other to define openings of different widths to thereby accommodate bike wheels of different widths.

4. A collapsible bike rack according to claim 1 wherein said straps are each comprised of looped lengths of inelastic fabric having a cinch thereon and said releasable coupling means are hooks.

5. A collapsible bike rack according to claim 1 further comprising a pair of floor anchors adapted for securement to said bed of a vehicle in laterally spaced separation from each other and to the rear of said means for rotatably coupling said arms to said bed of a vehicle and further comprising additional straps of adjustable length having releasable coupling means for releasably securing said floor anchors to said bike positioned with a wheel in one of said openings.

6. A device according to claim 2 wherein said grate defines a plurality of bike wheel receiving slots.

7. A device according to claim 2 wherein said grate defines a plurality of bike wheel receiving slots of different widths.

8. A device according to claim 2 wherein said common horizontal axis lies between said top and bottom members of said grate.

* * * * *